Dec. 1, 1942.　　　　C. B. MOORE　　　　2,303,890
CONTROL INSTRUMENT
Filed May 23, 1939　　　　2 Sheets-Sheet 1
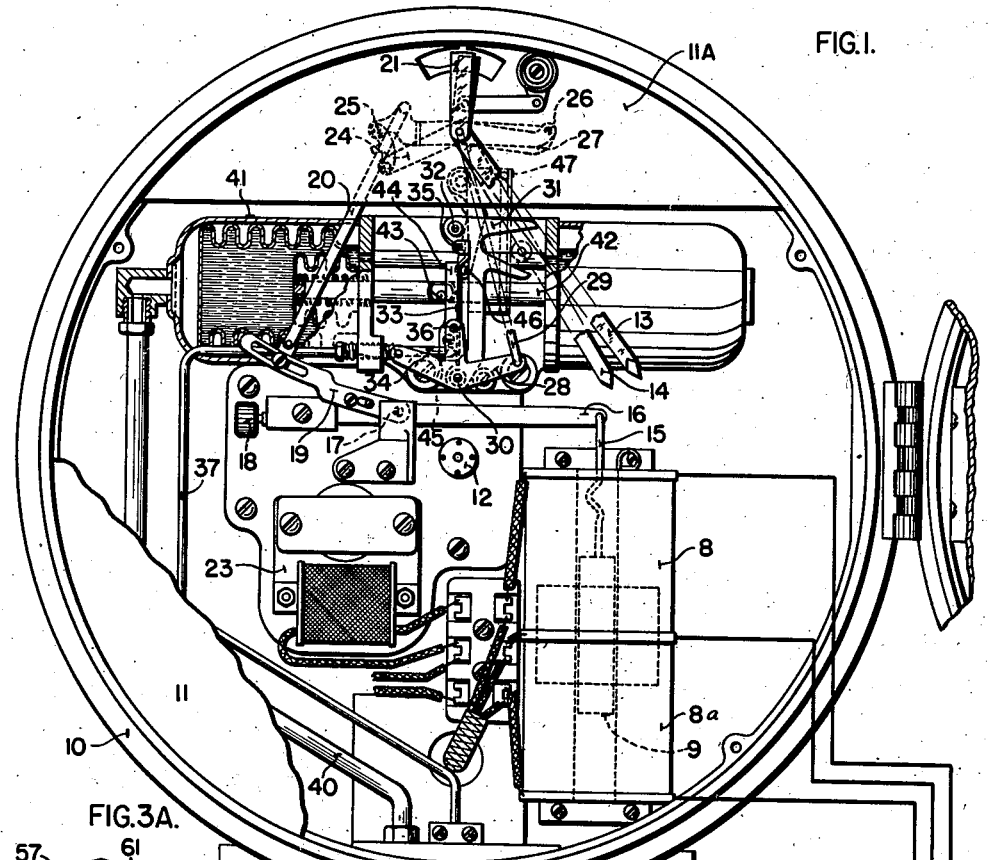
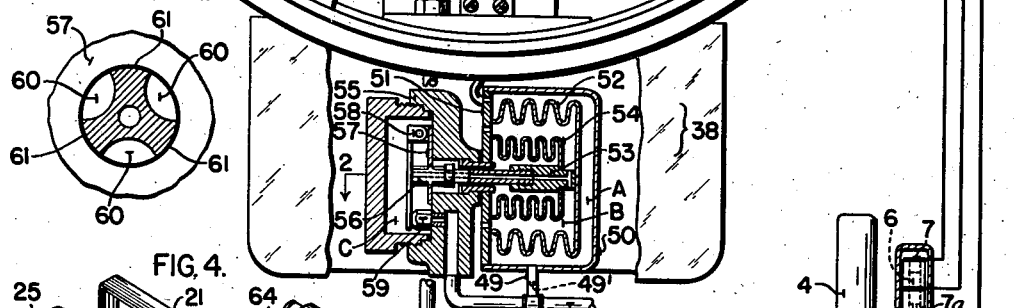
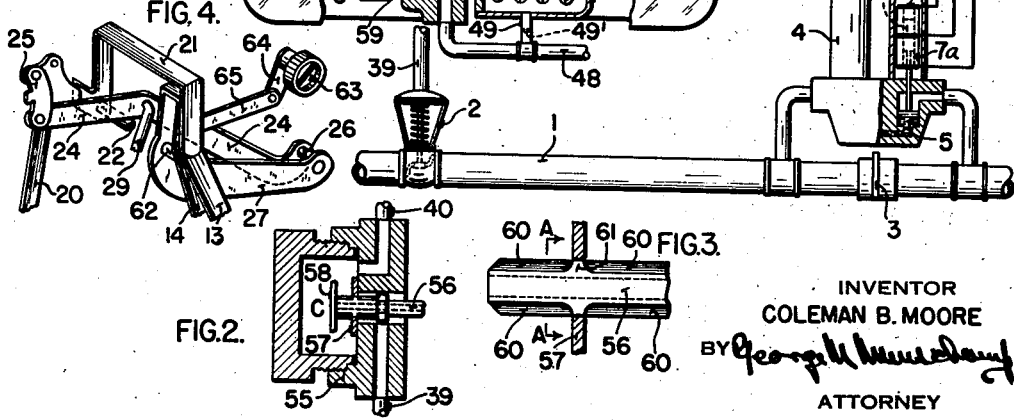
INVENTOR
COLEMAN B. MOORE
BY
ATTORNEY Dec. 1, 1942.                C. B. MOORE                 2,303,890
                           CONTROL INSTRUMENT
                          Filed May 23, 1939              2 Sheets-Sheet 2
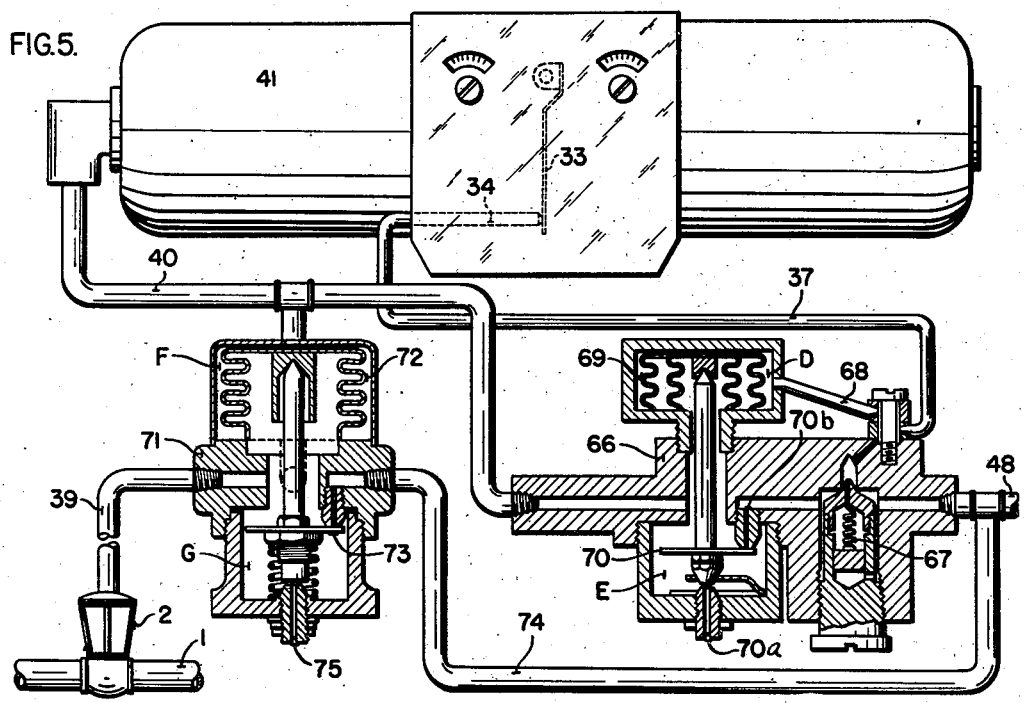
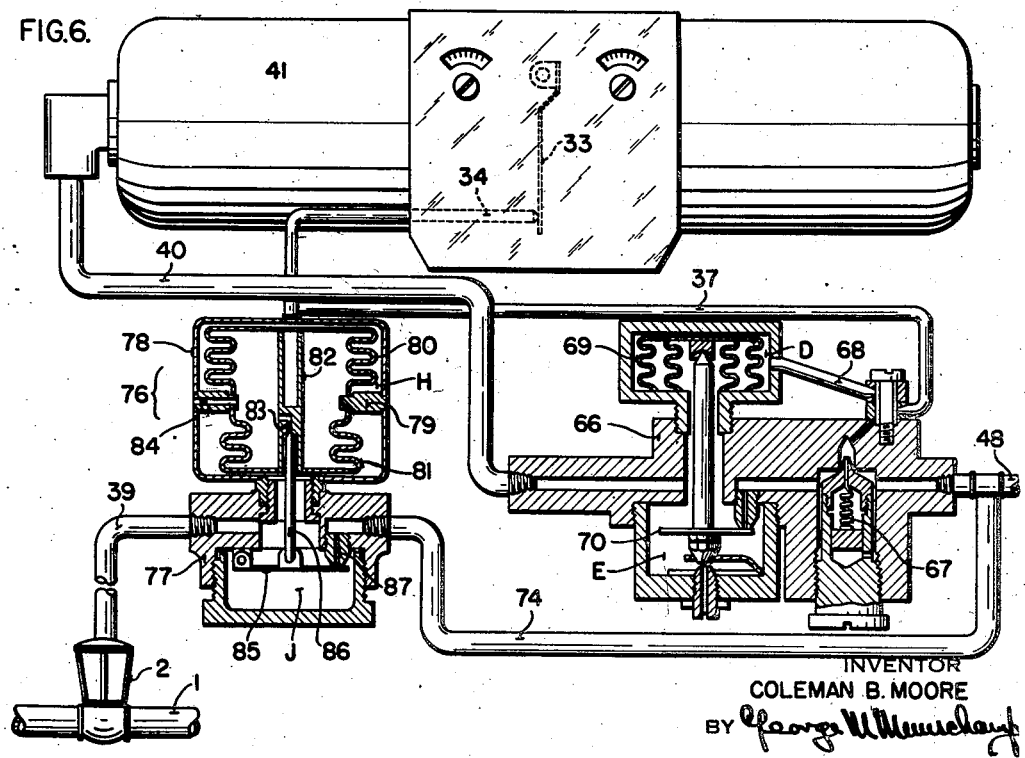
INVENTOR
COLEMAN B. MOORE
BY *George W. Mumaugh*
ATTORNEY Patented Dec. 1, 1942

2,303,890

UNITED STATES PATENT OFFICE 2,303,890

CONTROL INSTRUMENT

Coleman B. Moore, Carroll Park, Pa., assignor to The Brown Instrument Company, Philadelphia, Pa., a corporation of Pennsylvania Application May 23, 1939, Serial No. 275,206

10 Claims. (Cl. 137—152.5)

The present invention relates to control instruments and more particularly to those instruments known as "air controllers" in which the variation of the value of a condition is used to change the regulating pressure of an actuating fluid that is used to control the position of a valve or other regulating apparatus.

It is an object of the present invention to provide a pilot valve which is responsive to the condition being measured to regulate the control pressure applied to the control element.

It is a further object of my invention to provide a pilot valve of the non-leak type or one in which the admittance or exhaust of the actuating fluid from the valve is not permitted except at the time of a change in the value of the condition being measured. This has the advantages of maintaining the pressure in the system at a constant value and of not using any of the actuating fluid except at times of change in the condition.

It is a further object of the invention to provide a control system which utilizes one or more pilot valves to regulate the control pressure applied to the control element.

It is a further object of the invention to provide a pneumatic control system in which provision is made for the inertia of the controlling medium with respect to the controlled medium so that hunting of the controlled medium is prevented and an accurately controlled condition is maintained.

In the control of various conditions, there is a lag between the time a correction is applied to the condition and the time that a change in the condition is noted at the measuring and control instrument. In instruments of the type in which a controlling pressure is produced which is proportional to some function of a variable condition by pneumatic follow-up means, there is also a lag in the control instrument between the time a correction is made by it and the time the follow-up provisions of the instrument come into effect to remove part of the correction in producing the proportional controlling pressure. If these two time lags are not of the same magnitude an undesirable hunting of the condition will occur. This is particularly true in the measurement and control of the flow of a fluid when the follow-up provisions referred to involve large fluid capacity conduits, as is necessary in some cases. As the opening of a valve in a fluid conduit is changed the response of the flow thereto is practically instantaneous while there is usually some lag in the follow-up provisions of the instrument. This undesirable condition can be corrected by slowing down the response of the control valve with respect to the instrument which has the obviously undesirable feature of sacrificing closeness of control. With the preferred form of the invention I attain the speeding up of the response of the instrument with respect to the control valve with the ultimate aim of eliminating the objectionable hunting referred to without sacrificing close control.

While I will describe my invention in connection with the control of a fluid flowing through a conduit it is obvious that it may be used in the control of other variables wherein the same condition exists.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a view, partly in section, showing one form that my invention may assume;

Fig. 2 is a section view taken on line 2—2 of Fig. 1;

Fig. 3 is an enlarged view of the nozzle in the pilot valve;

Fig. 3A is an enlarged view of the nozzle taken on line A—A of Fig. 3;

Fig. 4 is a perspective view of certain levers shown in Fig. 1;

Fig. 5 is a view of a modified form of control system; and

Fig. 6 is a view of a still further modified form of control system.

Referring now to Fig. 1, there is shown a pipe 1 the flow through which is to be measured and controlled. Located in the pipe is a valve 2 which is normally biased to a closed position by a spring but may be opened various amounts by varying the pressure of air, or other suitable gas, applied to the top of a diaphragm attached to the valve stem. Located in the pipe 1, downstream of the valve, is an orifice 3, the pressure drop across which is used to determine the flow. The pressure drop is measured by a manometer 4 of any commercial design, but preferably of the type shown in Patent 1,743,852 granted to Thomas R. Harrison. In this manometer the differential pressure across the orifice is impressed upon the sealing liquid 5, the level of the liquid in either leg of the manometer forming a measure of the fluid rate of flow. A float on the liquid in one of the manometer legs rises and falls with the sealing liquid and carries an armature 6 adapted to cooperate with induction coils 7 and 7a forming the transmitting element of a distant reading system. The receiving element of this system includes receiving coils 8 and 8a electrically connected to the transmitting coils and inductively related to a receiving armature 9, which as more fully described in the above mentioned patent, is thereby given movements corresponding to movements of the armature 6 carried by the manometer float.

The coils 8, 8a are located in any suitable instrument casing 10, shown herein as being circular in shape, that is provided with a door having a glass window therein. The coils 8, 8a, along with other parts to be described, are preferably covered by plates 11 and 11A through which project a chart supporting hub 12, a pen arm 13, upon which is mounted a suitable pen, and an index pointer 14.

Connected to the armature 9 by a link 15 is a lever 16, pivoted at 17, and provided with an adjustable counterweight 18 to counterbalance the weight of the armature 9. A curved member 19 is attached to the lever 16 and has adjustably secured to it one end of a link 20 the other end of which is attached to one arm of a yoke shaped lever 21. This lever is pivoted on a shaft 22 attached to the casing 10, and has one arm of the yoke extending forwardly through the plate 11A and attached to the pen arm 13. Therefore as the armature 9 moves in response to changes in flow the pen arm 13 will be moved around an axis coincident with shaft 22. The pen on arm 13 is adapted to make a record on a suitable chart that is placed on the plate 11 and rotated by chart hub 12. The chart hub is driven at a speed of one revolution every twenty-four hours (or other time interval) by a synchronous motor 23 located within the casing 10.

Movement of the link 20 also gives a corresponding movement to a lever 24 by means of a short link 25 connected to that lever and member 21. The lever 24 is pivoted around a normally stationary, but adjustable fulcrum point 26 carried by a supporting lever 27 which may be adjustable as hereinafter described. Movements of the lever 24 are transmitted to a valve actuating element 28 by a connecting link 29 to thereby effect a corresponding initial control force adjustment of a port throttling element of a control valve.

The control apparatus through which the longitudinal movements of the link 29 produce control effects by giving movements to the actuating element 28 may take various forms. As shown, the control apparatus is an air actuated controller of a form which is fully disclosed in my Patent Number 2,125,081, dated July 26, 1938, and is now in extensive commercial use. The lever 28 is pivoted at 30 to an adjustable fulcrum member 31 in the form of a lever having a stationary fulcrum pivot 32. The movements of the lever 28 produce control effects by moving a flapper valve 33 away from or permitting it to approach a nozzle or bleed orifice member 34. The flapper valve 33 is mounted on a stationary pivot 35 and is biased for movement in the direction in which it approaches and restricts the discharge through the nozzle 34. The lever acts on the flapper 34 through a pin 36 carried by a depending arm of the lever.

The nozzle 34 receives air from a pipe 37 supplying air at a suitable and approximately constant pressure, through a restricted passage formed by a small bore pipe 49 included in a pilot valve mechanism 38, so that the pressure in the nozzle 34, which constitutes the primary control pressure of the control apparatus, increases and decreases as the flapper valve 33 moves toward and away from the nozzle.

The ultimate control pressure is transmitted by a pipe 39 to the device to be controlled which, as shown is the fluid pressure valve 2 controlling the flow in pipe 1. The ultimate control pressure is also transmitted by pipe 40 to mechanism 41 forming a part of the control apparatus of Fig. 1, and adapted, following and as a result of each initial change in the ultimate control pressure effected through link 29, to give the lever 28 an initial follow-up adjustment and a delayed compensating adjustment. The follow-up adjustment neutralizes a portion of the initial adjustment of the flapper valve 33 effected by the link 29. The delayed compensating adjustment slowly neutralizes more or less of the effect of the preceding follow-up adjustment.

The mechanism 41 comprises bellows elements, two of which are connected by a connecting rod 42 which carries a projection 43. The latter acts on lever 31 through a lever 44 pivoted at 45 and a pin 46 interposed between the levers 44 and 31. The pin 46 is supported by a member 47 adjustable to vary the leverage with which the lever 44 acts on the lever 31. The latter is biased for movement in the clockwise direction, as seen in Fig. 1.

Details of the construction and operation of the mechanism, not specifically referred to herein, will be understood by those skilled in the art from the drawings, and need not be described herein, particularly as that mechanism is not only fully disclosed in said prior Patent 2,125,081, but is in extensive use. Moreover, the particular form of the control apparatus actuated by the longitudinal movements of the link 29 forms no part of the present invention, though it is an advantage of the present invention that it permits the ready combination with a measuring instrument of the character disclosed.

The pilot valve mechanism 38 used with this embodiment of the invention is of novel design. Air under a constant pressure is supplied from some suitable source through a conduit 48 and a small line 49 containing a pressure reducing restriction 49' to a chamber A formed of a cap 50 attached to a stationary plate 51 and a bellows 52 that is also attached to the plate. A small opening in the plate is provided so the conduit 37 leading to the bleed nozzle 34 may also be connected to the chamber formed between cap 50 and bellows 52. In this manner movements of the flapper valve 33 relative to the nozzle 34 permits more or less air to escape therethrough to vary the pressure in chamber A thereby permitting the bellows 52 to elongate or contact as the pressure is decreased or increased, respectively. Movement of the bellows is used to control the pressure applied to the diaphragm of valve 2 and to effect the adjustment of the control apparatus 41.

Rigidly connected with the bellows is a hollow stud 53 whose opening communicates with a second chamber B formed between the bellows 52 and a bellows 54, also attached to the plate 51.

This chamber B is in communication with the atmosphere by means of small openings in the plate 51. As shown the plate 51 is supported by a casting 55 that has an opening in it in axial alignment with the stud 53. Secured to the stud 53 and extending through the opening in the casting is a hollow exhaust nozzle 56 which also passes through an opening in a guide and flapper supporting plate 57. A flapper 58 is pivotally mounted on the plate 57 and has a normal counterclockwise bias into engagement with the end of nozzle 56 and with a nozzle 59 that is in direct communication with the air supply conduit 48. As is best shown in Fig. 2 a chamber C formed in the casting 55 to the left of plate 57 is in communication with the conduit 40 leading to the control mechanism 41. The space in the casting 55 to the right of the plate 57 is in communication with the interior of bellows 54, and, as shown, in Fig. 2, is directly connected to the conduit 39 leading to the valve 2.

As is best shown in the enlarged views of Figs. 3 and 3A, the nozzle 56 is provided with cut-back portions 60 on its surface that merge into a "land" 61 which is circular in shape and the size of the outside diameter of the nozzle. The "land" is of a width equal to the thickness of the plate 57. In a position of equilibrium the bellows 52 is of such a length that nozzle 56 is positioned with its "land" 61 in line with plate 57 and with flapper 58 covering both of the nozzles 56 and 59. In this position a small amount of air can leak between the nozzle 56 and plate 57 to equalize the pressures in chamber C and conduit 39. In normal operation of the device for small movement of the nozzle 56 air can leak slowly past the plate 57 to equalize the pressures in chamber C and the valve 2, but for large movements of the nozzle, equalization may take place rapidly since the cut-out portions 60 permit air to flow readily between chamber C and the valve. The tip of nozzle 56 is made detachable so that under some circumstances a nozzle without the "land" 61 on it may be used.

It is noted that the pipe 40 is not connected directly to the line 37, and thereby subjected directly to the variable pressure produced by changes in the flow. The reason for this is that the pressure in line 37 is kept at a relatively low value for purposes of obtaining proper nozzle characteristics and to minimize the valve leakage. Furthermore a relatively large amount of power is necessary to adjust the instrument 41 and the valve 2. This power may be easily obtained by using air at a higher pressure than it is desirable to use in the line 37. The necessary pressure differential between that used in line 37 and the conduits 39 and 40 is obtained by having the bellows 52 and 54 of the pilot valve formed of different areas. The ratio of the areas of the two bellows is usually five to one, but may be made at any other desirable value.

In the operation of the system an increase in flow through the conduit 1 will cause the armature 6 to rise in the coils 7, 7a. This in turn causes armature 9 to rise and through lever 16, link 20 and lever 21 moves the pen arm 13 in a counter-clockwise direction to indicate on the chart an increase in the flow. This same movement of lever 21 will, through lever 24, lower link 29 to turn member 28 clockwise so that pin 35 may move flapper valve 33 away from nozzle 34 thus permitting more air to escape through the nozzle and reduce the pressure in chamber A. As pressure in A reduces the bellows 52 will elongate to shift the nozzle 56 to the right away from flapper 58. Air may therefore escape from chamber C through the nozzle to chamber B and the atmosphere. As the pressure in chamber C is reduced the follow-up action of the instrument 41 will immediately begin due to the reduction of air pressure in its left hand bellows chamber. This follow-up action may proceed at a relatively rapid rate due to the fact that the nozzle 56 extends directly into chamber C. At the same time the nozzle 56 moves to the right to permit reduction of pressure in chamber C, the pressure in conduit 39 and upon the diaphragm of valve 2 also begins to fall off, but at a slower rate. This reduced rate is due to the comparatively slow leakage of air past plate 57 into the chamber C. Thus the valve 2 is permitted to close slowly.

In this manner the control unit 41 will first take its correct position in response to a change in flow before the pressure change in the chamber C has had its full effect on the valve 2. Accordingly pulsations in the flow will be eliminated.

When the change in flow is small the above operation will take place. When, however, the increase in flow is large the flapper will be moved a greater distance from the nozzle 34 and a larger reduction of pressure will take place in chamber A. The nozzle 56 will therefore move to its extreme right hand position which, due to the cut-out portions 60, will open the chamber C to the valve to give a quick response for changing the flow toward normal. As the balanced position is approached, the connection between the chamber C and the valve will be restricted to slow down the valve action and permit the control unit 41 to balance out before the valve pressure has had a chance to overshoot.

It should be noted that the difference in the lag effect on the control action due to large and small changes in the flow is of considerable importance. On large changes in flow the valve 2 must be adjusted quickly and a large supply of air is admitted by the pilot valve into conduit 39. This rapidly acts on the valve 2 even though the volume of conduit 39 is relatively large. For small changes in flow the necessity for rapid adjustment of valve 2 is not so great as before and it is therefore permissible to slow up its action. The action of the control valve 2 under small changes in flow is further retarded since the effect of the capacity of conduit 39 is more pronounced. In other words a large pressure change in chamber C will have its effect transmitted more rapidly to control valve 2 than will a small pressure change, and the speed of transmission will slow down as the control valve 2 approaches its new position and the nozzle 56 approaches the position where land 61 is in alignment with plate 57.

For an initial reduction of flow the operation of the system would be opposite to the operation just described, as will be obvious. It is noted, however, that upon a movement of nozzle 56 to the left the flapper 57 will be moved clockwise to uncover nozzle 59. In this manner air from the conduit 48 will be admitted to increase the pressure in chamber C and the valve 2.

The previously-mentioned adjustments of the fulcrum pin pivot 26 of the lever 24 are effected by adjustment of the lever 27 about its supporting shaft 62 which is coaxial with shaft 22. As shown, the lever 27 is adjusted by rotation of a knob 63 mounted in the instrument framework and frictionally held in any position to which it is adjusted. The knob 63 carries a crank arm 64 connected by a link 65 to a yoke extension of the lever 27. One leg of the yoke is extended to form an index or pointer 14 which indicates on the chart the normal value of flow that the control apparatus is intended to maintain. When the actual value of the flow is equal to the normal value, as indicated by the pointer 14, the end of pen arm 13 will be the same radial distance from the center of the chart. By changing the setting of pointer 14 in the above-described manner, the relation of various parts of the control apparatus will be altered in such a manner that adjustments of the valve will maintain different values of flow in pipe 1.

In the embodiment of the invention disclosed in Fig. 5 the same result is accomplished in a different manner. Air is supplied from pipe 48 at a suitable constant pressure to a pilot valve 66. The air passes through a restricted passage formed by a small bore pipe 67 included in the pilot valve mechanism, through the line 37 to nozzle 34. The primary control pressure is transmitted by a pipe 68 to a chamber D of the pilot valve. One wall 69 of the chamber D is movable and is formed of a pair of bellows having different areas to obtain the proper pressure differential between the chamber D and a chamber E on the other side of the wall. The pressure in the latter chamber is regulated by a valve 70 actuated by the movable wall 69, and operating between exhaust port 70a and supply port 70b. The pressure in the chamber E is thus maintained in constant proportion to the control pressure in chamber D and constitutes the pressure applied to the instrument 41 through line 40.

The pressure in line 40 is applied to a chamber F of a pilot valve 71, similar in most respects to pilot valve 66. One wall 72 of the chamber F is movable and separates that chamber from a second chamber G the pressure in which is regulated by a valve 73. The chamber G is connected with the source of air supply by a pipe 74, with the atmosphere by an opening 75, and with the valve 2 by the pipe 39. The pressures in chambers F and G vary directly since only a single bellows 72 is used as the dividing wall.

In the operation of this system, movement of the flapper 33 relative to the nozzle 34 varies the leakage of air from the nozzle and therefor the pressure in chamber D. If, for example, the pressure in D is increased the valve 70 will be moved downwardly to admit more air to and increase the pressure in chamber E. This increase of pressure is transmitted through line 40 to the left bellows chamber of the instrument 41 and to chamber F of valve 71. The increased pressure in chamber F will move valve 73 downwardly to permit an increase in pressure in chamber G, line 39, and the valve 2. In this manner the capacity in the conduit 40 between pilot valve 66 and the follow-up bellows of unit 41 is reduced to a point that the instrument 41 can rebalance itself quickly. This is true because the air delivered from 66 is only that which is necessary to fill the pipe 40, chamber F and the bellows chamber in the instrument 41. The line 39 is usually of considerable length and therefore has a relatively large volume, so that in the absence of pilot valve 71 an objectionable lag would be introduced.

In the embodiment of Fig. 6 the operation of the system is the same as it was in Fig. 5. The various parts of the system, however, are arranged in a different manner and a pilot valve slightly different in construction from those previously described is used. In the system of Fig. 5 the pressure in chamber E of pilot valve 66 is used to adjust a second pilot valve which in turn controls the pressure applied the diaphragm of the control valve 2. In the system of Fig. 6 the pressure in the line 37 supplying air to nozzle 34 is used to control a second pilot valve 76 which regulates the air to the control valve 2.

The pilot valve 76 comprises a stationary casting 77 to which is attached a cover member 78 having an annular partition 79 extending around its interior. Attached to the partition is a bellows 80 that forms between its exterior and the cover 78 a chamber H. Fastened to the lower side of the partition 79 is a second bellows 81, preferably enough smaller than the bellows 80 so that there is a ratio between the bellows equal to the ratio between the two bellows forming the movable wall 69 between chambers D and E in the pilot valve 66. The end walls of the bellows 80 and 81 are constrained for movement together by a post 82 rigidly attached to the end wall of each; the post being provided with an opening 83 extending from below bellows 81 to the interior thereof, which is in turn in communication with the atmosphere by means of an opening 84 in the partition 79.

Mounted in a chamber J, formed in the casting 77, is a flapper valve 85 which is spring biased in a counter-clockwise direction and has attached to it a rod 86 that extends into the opening 83 in the post 82. As the post moves up or down due to pressure changes in the chamber H the rod 86, will serve to open or close the opening 83. As the pressure in chamber H decreases the bellows 80 will expand and move post 82 upwardly to open the port 83 and permit chamber J to communicate with the atmosphere. When, however, pressure in chamber H increases the bellows 80 will contract and post 82 will be moved downwardly. This moves the rod 86 into the opening 83 to close that opening and moves, through rod 86, the flapper 85 clockwise against its bias to open a nozzle 87 that is connected with the air supply 48 by means of the pipe 74. The chamber J is also in communication with the valve 2 by means of the pipe 39.

In the operation of the embodiment of the system a movement of flapper 33 relative to nozzle 34 will vary the leakage through the nozzle and therefore the pressure in chambers D and H of pilot valves 66 and 76, respectively. Change of pressure in chamber D will vary the position of valve 70 and thereby change the pressure applied to the bellows chamber of instrument 41 in a manner previously described. The corresponding change in pressure in the chamber H will either open chamber J to the atmosphere or permit air under pressure to enter from pipe 74. Thus the pressure applied to the bellows chamber of the instrument 41 and the diaphragm of the valve 2 will be changed, but as in the system of Fig. 5 the volume of air delivered from the pilot valve 66 is so small compared to that delivered by the pilot valve 76 that the instrument 41 can rebalance itself more quickly than the control valve 2 is adjusted.

From the above detailed description it will be seen that the difference in time of response of the measuring and control components of a control system is taken into account in order to obtain a control action that is free from oscillations of the controlled medium. This may be done either by varying the speed with which the control pressure is applied to the instrument relative to that with which it is applied to the control valve or may be done by varying the volume of air between the pilot valve and the instrument and between the pilot valve and the control valve. In either case a novel non-leak pilot valve such as is shown at 38 and 76 may be used.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring and control system the combination of a control instrument having follow-up provisions with a time lag in their operation, a control member for a condition to be regulated located remote from said instrument and having a time lag less than that of said follow-up provisions, means to measure the value of said condition, a relay mechanism forming part of said control instrument operated by said measuring means, means to supply a control adjustment to said instrument follow-up provisions and member in response to operation of said relay mechanism including means to delay substantially the response to the adjustment of said member with respect to that of said follow-up provisions comprising a variable restriction adjusted in accordance with operation of said relay member said variable restriction being located adjacent to said instrument and remote from said control member.

2. In a measuring and control system the combination with a conduit the flow through which is to be measured and controlled, a control instrument having follow-up provisions with a time lag in their operation, a control member located remote from said instrument and having a time lag less than that of said follow-up provisions, means to measure the flow through said conduit, means operated by said measuring means to supply a control adjustment to said instrument follow-up provisions and to said member, including means to delay substantially the response thereto of said member with respect to said instrument comprising an adjustable valve mechanism adjacent said instrument and remote from said member and in the path of said adjustment to said member, said valve member being operated by said adjustment.

3. In a measuring and control system, the combination with a conduit the flow through which is to be measured and controlled, a measuring and control instrument provided with follow-up mechanism with a time lag in its operation, a control member with a smaller time lag to regulate the flow through said conduit and located remote from said instrument, means responsive to variations in the value of said flow to initiate a control adjustment operative to adjust said control member and said follow-up mechanism, said means including an adjustable valve operated by said adjustment, said valve being located adjacent said instrument and remote from said control member and constructed and arranged to delay the application of said adjustment to said member with respect to its application to said follow-up mechanism so as to tend to equalize said lags.

4. In a measuring and control system the combination with a control couple provided with follow-up mechanism having a time lag in its operation, a control member with a time lag in its operation shorter than that of said follow-up mechanism, a pilot valve responsive to movements of said couple, a source of fluid under pressure to actuate said mechanism and member, means in said valve to retard actuation of said member with respect to said mechanism comprising a chamber having a partition wall therein, one side of said chamber being in communication with said mechanism and in adjustable communication with said source, the other side of said chamber being in communication with said member and means to restrict flow of said fluid past said wall upon small movements and permit freer flow of said fluid upon larger movements of said couple.

5. In a measuring and control system, the combination of a valve having a comparatively short time lag adapted to control the flow of a fluid, measuring means to measure the value of a condition adjusted by the flow of the fluid through said valve, control means operated by said measuring means in accordance with measurements made thereby, said control means having follow-up provisions having a comparatively long time lag, a source of fluid under pressure adapted to adjust the follow-up provisions of said control means and said control valve, and pilot valve means operated by said control means in response to measurements made by said measuring means to vary the pressure supply, said pilot valve means including to delay the application of said varied pressure to said valve with respect to said control means follow-up provisions.

6. In a measuring and control system the combination of an air operated control instrument having follow-up provisions with a time lag, measuring means responsive to the value of a variable condition to adjust said control instrument in response to variations in the value of said condition, an air operated control valve with a lag shorter than that of said follow-up provisions adapted to control the supply of a condition changing medium, a source of pressure fluid, pilot valve means operated by said control instrument in response to variations in the condition as measured by the measuring means to vary the supply of pressure, flow controlling means in said pilot valve to delay the application of said varied pressure to the control valve with respect to its application to the follow-up provisions of the control instrument.

7. In a control system in which there is a lag in the time between when a control correction is applied to a condition and when a measurement of the effect of the same can be taken, the combination of a control instrument having follow-up provisions with a lag greater than the above mentioned lag, relay means forming part of said control instrument, a control member located at a distance from said control instrument adapted to control the value of a condition, means to measure the value of said condition, means operated thereby to adjust said relay means, means to supply a control adjustment to said follow-up provisions and said control member in response to operation of said relay means including means to delay substantially the application of said control adjustment to said control member with respect to its application to said follow-up provisions, said last means including a variable restriction located closely adjacent said relay means and remote from said control member.

8. In an air control system in which there is a lag between the time when a correction is made to a condition and when a measurement of its effect can be made, the combination of an air control instrument having follow-up provisions with a lag greater than the first mentioned lag, a relay mechanism forming part of said instrument, means to measure the value of said condition, an air actuated member located remote from said instrument to control said condition, a source of fluid supply, means operated by said measuring means to operate said relay mechanism, said relay means operating to set up a control pressure of said fluid supply in accordance with the value of said condition, means to apply said pressure to said follow-up provisions and said control member including an adjustable restrictor located closely adjacent said relay means and remote from said control member to delay substantially the application of said control pressure to said control member with respect to its application to said follow-up provisions.

9. In a measuring and control system in which there is a lag in time between the application of a control adjustment and the measurement of the results of said adjustment, the combination of an air operated valve to control the flow of a fluid, an air control instrument having follow-up provisions with a time lag greater than the lag above mentioned, means to measure the flow of fluid, a pilot valve operated in response thereto to set up an air pressure proportional to said measurement, means forming part of said pilot valve to direct said air pressure to said follow-up provisions and said control valve including a restriction in said pilot valve through which air pressure to said control valve must pass.

10. In a measuring and control system in which there is a lag in time between the application of a control adjustment and the measurement of the results of said adjustment, the combination of an air operated valve to control the flow of a fluid, an air control instrument having follow-up provisions with a time lag greater than the lag above mentioned, means to measure the flow of fluid, a source of air under pressure, a pilot valve to regulate the pressure thereof, means to operate said pilot valve by said measuring means, said pilot valve including a first chamber connected to said follow-up provisions, a second chamber connected to said control valve, means to apply the pressure regulated by said pilot valve directly to said first chamber and means to restrict the flow of air between said first and second chambers.

COLEMAN B. MOORE.